(12) United States Patent
Duncan et al.

(10) Patent No.: US 9,701,086 B2
(45) Date of Patent: Jul. 11, 2017

(54) BIOMASS PELLET AND METHOD OF PRODUCING SAME

(75) Inventors: William Andrew Duncan, Whitby (CA); Andrew Pollard, Kingston (CA); M. Hachimi Fellouah, Sherbrooke (CA)

(73) Assignee: Queen's University at Kingston, Kingston (CA)

( * ) Notice: Subject to any disclaimer, the term of this patent is extended or adjusted under 35 U.S.C. 154(b) by 883 days.

(21) Appl. No.: 13/984,131

(22) PCT Filed: Feb. 9, 2012

(86) PCT No.: PCT/CA2012/000098
§ 371 (c)(1),
(2), (4) Date: Oct. 30, 2013

(87) PCT Pub. No.: WO2012/106801
PCT Pub. Date: Aug. 16, 2012

(65) Prior Publication Data
US 2014/0183791 A1    Jul. 3, 2014

Related U.S. Application Data

(60) Provisional application No. 61/441,510, filed on Feb. 10, 2011.

(51) Int. Cl.
*B30B 11/02*      (2006.01)
*C10L 5/32*       (2006.01)
(Continued)

(52) U.S. Cl.
CPC .......... *B30B 11/027* (2013.01); *B29C 43/021* (2013.01); *C10L 5/32* (2013.01);
(Continued)

(58) Field of Classification Search
CPC ............................................. B30B 11/02–11/14
(Continued)

(56) References Cited

U.S. PATENT DOCUMENTS 4,015,951 A    4/1977   Gunnerman
4,260,573 A    4/1981   Overman
(Continued)

FOREIGN PATENT DOCUMENTS

FR    973541 A   *   2/1951   ................ C10L 5/02
GB    2448531 A       10/2008
(Continued)

OTHER PUBLICATIONS

International Search Report for International Application No. PCT/CA2012/000098 filed on Feb. 9, 2012.
(Continued)

*Primary Examiner* — Benjamin Schiffman
(74) *Attorney, Agent, or Firm* — Stephen J. Scribner (57) ABSTRACT

Described is a substantially spherical biomass pellet, comprising compressed particulate biomass including one or more of ligno-cellulosic material, recycling waste, and dewatered municipal solid waste, useful as a fuel. Also described are methods for producing such pellets using one or more of untorrefied biomass and torrefied biomass, and apparatus for producing such biomass pellets.

21 Claims, 3 Drawing Sheets

(51) Int. Cl.
*C10L 5/36* (2006.01)
*C10L 5/40* (2006.01)
*C10L 9/08* (2006.01)
*B29C 43/02* (2006.01)

(52) U.S. Cl.
CPC ............... *C10L 5/363* (2013.01); *C10L 5/40* (2013.01); *C10L 9/083* (2013.01); *Y02E 50/10* (2013.01); *Y02E 50/15* (2013.01); *Y02E 50/30* (2013.01)

(58) Field of Classification Search
USPC ........................................ 425/408, 233, 406
See application file for complete search history.

(56) References Cited

U.S. PATENT DOCUMENTS

| | | | |
|---|---|---|---|
| 4,946,317 A | 8/1990 | Liu et al. | |
| 5,305,687 A | 4/1994 | Cantrell et al. | |
| 5,658,357 A | 8/1997 | Liu et al. | |
| 6,099,772 A * | 8/2000 | Hinzmann | B22F 3/03 264/109 |
| 6,152,973 A | 11/2000 | Romell | |
| 2003/0221363 A1 | 12/2003 | Reed | |
| 2004/0028765 A1* | 2/2004 | Kerzner | A61J 3/10 425/167 |

FOREIGN PATENT DOCUMENTS

| | | |
|---|---|---|
| WO | WO2006102543 A1 | 9/2006 |
| WO | WO2009038252 A1 | 3/2009 |
| WO | WO2010138514 A2 | 12/2010 |

OTHER PUBLICATIONS

Written Opinion for International Application No. PCT/CA2012/000098 filed on Feb. 9, 2012.
Hakkou, M., et al., "Investigation of wood wettability changes during heat treatment on the basis of chemical analysis", Polym. Degrad. Stab., vol. 89, pp. 1-5, 7, (2006).
Lehtikangas, P., "Storage effects on pelletised sawdust, logging, residues and bark", Biomass Bioenergy, vol. 19, pp. 287-293, 11, (2000).
Lehtikangas, P., "Quality properties of pelletised sawdust, logging residues and bark", Biomass Bioenergy, vol. 20, pp. 351-360, 5, (2001).
Li, Y., et al., "High-pressure densification of wood residues to form an upgraded fuel", Biomass Bioenergy, vol. 19, pp. 177-186, (9), (2000).
vanDam, J.E.G., et al., "Process for production of high density/high performance binderless boards from whole coconut husk: Part 1: Ugnin as intrinsic thermosetting binder resin", Industrial Crops and Products, vol. 19, pp. 207-216, 5, (2004).
Demirbas, A., "Sustainable Cofiring of Biomass with Coal", Energy Conversion and Management, vol. 44, pp. 1465-1479, 6, (2003).
Kumar, A., et al., "Pipeline Transport of Biomass", Applied Biochemistry and Biotechnology, vol. 113-116, pp. 27-39, (2004).
Bergman, P.C.A., et al., "Torrefaction for biomass upgrading", European Biomass Conference and Exhibition, pp. 1-8, (2005).
Uslu, A. et al., "Pre-treatment technologies, and their effect on International bioenergy supply chain logistics, Techno-economic evaluation of torrefaction, fast pyrolysis and pelletisation", Energy, 33, pp. 1206-1223, (2008).
Chin, O.C., et al., "Characteristics of some biomass briquettes prepared under modest die pressures", Biomass and Bioenergy, 18, pp. 223-228, (2000).
Hartley, I.D., et al., "Hygroscopic properties of densified softwood pellets", Biomass and Bioenergy, 32, pp. 90-93, (2008).
Kallyan, N. et al., "Factors affecting strength and durability of densified biomass products", Biomass and Bioenergy, 33, pp. 337-359, (2009).
Lipinsky, E.S. et al., "Enhanced Wood Fuels via Torrefaction", Fuel Chemistry Division Preprints, 47, (1), pp. 408-410, (2002).
Mani, S., et al., "Effects of compressive force, particle size and moisture content on mechanical properties of biomass pellets from grasses", Biomass and Bioenergy, 30, pp. 648-654, (2006).
Pach, M. et al., "Torrefied Biomass a Substitute for Wood and Charcoal", Sixth Asia-Pacific International Symposium on Combustion and Energy Utilization, pp. 1-6, (2002).
Prins, M.J. et al., "Torrefaction of wood Part 1 Weight loss kinetics", J. Anal. Appl. Pyrolysis, 77, pp. 28-34, (2006).
Prins, M.J. et al., "Torrefaction of wood Part 2, Analysis of products", J. Anal. Appl. Pyrolysis, 77. pp. 35-40, (2006).

* cited by examiner

BIOMASS PELLET AND METHOD OF PRODUCING SAME

RELATED APPLICATIONS

This is a 35 U.S.C. 371 national phase of International Patent Application No. PCT/CA2012/0000989, filed on 9 Feb. 2012, and claims the benefit of the filing date of U.S. Application No. 61/441,510, filed on 10 Feb. 2011, the contents of which are incorporated herein by reference in their entirety.

FIELD OF THE INVENTION

This invention relates to a biomass pellet that may be used as a fuel. In particular, the invention relates to a biomass pellet that is substantially spherical. The invention also relates to methods of producing a substantially spherical biomass pellet.

BACKGROUND

Biomass fuel pellets are currently manufactured by extrusion through a rotating die and roller assembly, or by a pair of rotating wheels and a round cylindrical extrusion mould. Recently, a technique involving a block and reciprocating piston has been proposed. Common to all of these methods is production of a cylindrical pellet on the order of 2.5 cm long with an aspect ratio of about 8.

Such pellets are generally made of sawdust or similar biological material and dried to about 8-12% moisture content prior to densification. Torrefaction may be used to improve properties of the biomass as a fuel. Torrefaction typically involves slow heating of the biomass in an inert atmosphere to a maximum temperature of 300° C., yielding a solid uniform product with a lower moisture content and a higher energy content per unit volume compared to the initial biomass. The process removes undesirable components of the material while reducing weight and maintaining most of the original energy content.

The sides of cylindrical pellets are smooth as the lignin naturally found in wood is extracted and coats the surface; however, the ends of the pellets are rough and exposed. The exposed ends allow for absorption of moisture. Such pellets are prone to breaking from handling and storage, creating dust and fines which cause a dangerous environment at processing facilities.

Where torrefaction is not employed, pellets retain sufficient moisture and hydrocarbon volatiles as to make for problems co-firing in a power plant. Pellets made of untorrefied material are also energy intensive to grind and may cause gumming and mechanical issues with grinding equipment, thereby requiring modifications to processing technology in the power plant. Further, untorrefied pellets are of a lower specific energy density than torrefied pellets, so they are more expensive a fuel to use, based on transportation costs.

SUMMARY

Described herein is a substantially spherical biomass pellet, comprising compressed particulate biomass. The biomass pellet is smooth substantially without fractured surfaces. The smooth surface may comprise a coating derived from lignin, cellulose, or a combination thereof. The biomass may comprise one or more of ligno-cellulosic material, recycling waste, and dewatered municipal solid waste. The ligno-cellulosic material may be derived from plant material. For example, ligno-cellulosic material may be derived from a tree, a shrub, grass, grain, fruit, vegetable, and/or algae. The pellet may further comprise at least one additive. The at least one additive may be selected from a hydrocarbon, plastic, lignin, distillers grain, and starch. The biomass may be heated, and heating may comprise torrefaction. The pellet may include rounded surfaces in three dimensions. The pellet may be spherical, spheroidal, ellipsoidal, or oblate.

Also described herein is a method for producing a substantially spherical biomass pellet, comprising heating and compressing particulate biomass in a substantially spherical mould so that a substantially spherical pellet is produced.

The method may comprise compressing the biomass between two or more mould faces, each face comprising a concave portion, the mould faces together forming a substantially spherical cavity; wherein movement of at least one said mould face toward at least one other said mould face compresses biomass material into the cavity to produce the substantially spherical biomass pellet. The method may comprise compressing and re-orienting the biomass in the cavity by moving a first mould face toward a second mould face, wherein the first and second mould faces are substantially opposed and at least one of the first mould face and the second mould face is not coaxial with a central axis of the mould cavity. The cavity may substantially encompass the biomass.

In one embodiment the biomass is subjected to a first heating prior to pelletization and subjected to a second heating during pelletization. In the first and second heatings, one or both of the target temperature for heating and the duration of heating may be the same, or may be different. In one embodiment the biomass is subjected to a first heating prior to pelletization, allowed to cool substantially to ambient temperature, and then subjected to a second heating during pelletization. In another embodiment the biomass is subjected to a first heating and, while still at an elevated temperature relative to ambient temperature, subjected to pelletization optionally including a second heating. In a further embodiment the biomass is subjected to heating during pelletization. In the latter embodiment, the heating during pelletization may be the only substantial heating of the biomass.

In these embodiments, heating includes raising the biomass to a temperature at which binders in the biomass are activated. The binders may be naturally occurring in the biomass, added to the biomass, or a combination thereof. Heating may include torrefaction. After heating, the biomass may contain substantially no living material.

The method may further comprise heating and compressing the biomass in the mould at a first pressure, and then further compressing the biomass at a second pressure. In one embodiment, the second pressure is greater than the first pressure. The method may further comprise heating and compressing the biomass in the mould, wherein compressing is carried out with increasing pressure until a maximum pressure is reached. The method may comprise applying the second pressure while the biomass is at or above a threshold temperature $T_{threshold}$. The method may comprise torrefying the biomass prior to placing it in the mould, and placing the torrefied biomass in the mould while it is at or above a threshold temperature $T_{threshold}$. Heating the biomass may comprise torrefying the biomass.

In accordance with the methods described herein, the pellet may include rounded surfaces in three dimensions. In various embodiments the pellet may be spherical, spheroidal, ellipsoidal, or oblate.

Also described herein is a method of producing torrefied biomass, comprising: substantially separating the biomass from air; and heating the biomass to a temperature and for a duration sufficient for torrefaction; wherein torrefied biomass is produced in the substantial absence of oxygen. The method may further comprise compressing the biomass prior to and during heating. Compressing, separating, and heating may be carried out in a mould that substantially encompasses the biomass.

Also described herein is a method for producing a substantially spherical torrefied biomass pellet, comprising: compressing biomass in a substantially spherical mould such that air and any other gas are forced out of the biomass, wherein the mould substantially encompasses the biomass; heating the compressed biomass material in the mould at a temperature and for a duration sufficient for torrefaction of the biomass; optionally further compressing the biomass during heating; further compressing the biomass after the duration for torrefaction. In some embodiments heating is carried out in the substantial absence of oxygen.

Also described herein is a mould assembly for producing a substantially spherical biomass pellet, comprising: two or more mould faces, each face comprising a concave portion; at least one said mould face being moveable toward at least one other said mould face, the mould faces together forming a substantially spherical cavity that substantially encompasses the biomass; wherein movement of said one mould face toward said other mould faces compresses biomass into the cavity to produce the substantially spherical biomass pellet.

In one embodiment, all mould faces are moveable, the mould faces together forming a cavity; wherein movement of said mould faces compresses biomass into the cavity to produce the substantially spherical biomass pellet. In another embodiment the mould assembly comprises a first mould face movable toward a second mould face, wherein the first and second mould faces are substantially opposed and at least one of the first mould face and the second mould face is not coaxial with a central axis of the mould cavity. In accordance with the embodiments described herein, the cavity may include rounded surfaces in three dimensions. In various embodiments the cavity may be spherical, spheroidal, ellipsoidal, or oblate.

BRIEF DESCRIPTION OF THE DRAWINGS

For a better understanding of the invention, and to show more clearly how it may be carried into effect, embodiments will be described, by way of example, with reference to the accompanying drawings, wherein.

DETAILED DESCRIPTION OF EMBODIMENTS

Conventional pellets made from wood or other biomass are cylindrical or briquette-shaped, and, whereas they may have smooth sides which afford protection from abrasion and moisture from the environment, they have ends that are rough and unprotected. For example, conventional pellets may be made by extruding biomass into rods, and breaking the rods into short (2-3 cm) lengths. This produces a pellet with smooth sides, but with rough, broken ends (referred to herein as "fractured surfaces"). These characteristics of shape and fractured surfaces result in pellets that are prone to abrasion and breaking during handling and storage, creating dust and fines which pose a danger at processing facilities, and allow for absorption of moisture. Further, handling and transportation of such pellets is hindered because of the cylindrical shape, which may lead to "log-jamming" in certain transportation systems such as pipelines.

Described herein is a biomass pellet that is substantially spherical in shape and has no fractured surfaces, such that it is smooth over substantially its entire surface. As such, a pellet in accordance with the invention has distinct advantages over prior pellets. For example, a sphere has the lowest surface area to volume ratio of any shape. Consequently, a spherical pellet has less surface area available for abrasion and absorption (e.g., of moisture) than a conventional pellet. Further, there are no corners or edges on a substantially spherical pellet that can be worn down or broken, unlike a cylindrical or briquette-shaped pellet. Thus, the substantially spherical shape together with a substantially smooth surface results in a pellet that has far greater resistance to abrasion and breakage during shipping and handling, as well as to moisture absorption.

In general, a biomass pellet according to the invention is characterized by a low surface-to-volume ratio, and an overall surface that is smooth, substantially free of fractured surfaces, and substantially lacking features such as corners and edges that may lead to abrasion, wear, and water absorption of the pellet. The smooth surface may be formed during moulding of the pellet. For example, moulding may include using a mould that substantially completely encompasses the biomass. The smooth surface contrasts with rough, fractured surfaces that may at least partially be present on some prior pellets. The term "substantially spherical" refers to a shape that includes rounded surfaces in three dimensions. For example, the shape may comprise multiple surfaces that vary in the degree to which they are rounded. In such embodiments, minor discontinuities may exist where two or more such surfaces meet. In other embodiments, the shape may be spherical, spheroidal, ellipsoidal, or oblate, e.g., a pellet having an equatorial diameter greater than the distance between its poles, or a pellet that is compressed along or flattened at its poles.

The smooth surface of a substantially spherical pellet may be at least partially derived from a coating around the entire pellet surface. The coating may comprise one or more components, such as lignin. In particular, the lignin and/or other components may be derived from the biomass from which the pellet is made. The lignin and/or other components may be extracted from the biomass during manufacturing of the pellet, e.g., as a result of manufacturing. Heating (e.g., torrefaction) and compaction of the biomass during manufacturing extracts lignin and/or other components, resulting in formation of the smooth surface coating. The smooth surface coating enhances favourable properties of the pellets, such as, for example, resistance to damage and breaking, low friction, and hydrophobicity (which prevents, inhibits, or reduces absorption of moisture), these being of concern in handling, transporting, and storing pellets. Pellets as described herein may be stored outside, like coal, whereas conventional pellets, which swell and break apart in a high moisture environment, cannot.

Substantially spherical pellets are well-adapted for transportation in a pipeline using a fluid carrier such as air or water. This is due to the shape, which has a lower drag coefficient than a cylindrical or briquette shaped pellet, the low surface area to volume ratio, and the smooth surface. These characteristics help to avoid or to reduce log jamming that occurs in the handling and transportation of conventional pellets. Substantially spherical pellets may be submerged in water or other carrier fluid and pipelined to a power plant or distribution centre for shipment. This would allow for easy and efficient transportation from the processing site to the end user.

A substantially spherical biomass pellet as described herein may be made using a compaction/compression mould assembly, comprising a substantially spherical mould cavity created by two or more mould faces, wherein one or more of the mould faces moves toward the other mould faces to thereby form the substantially spherical cavity and simultaneously compact biomass material into the cavity. The mould faces each constitute a section of the mould cavity. The sections may or may not be symmetrical or of equal area. In one embodiment, there are two substantially hemispherical mould faces. In other embodiments there are three, four, or more mould faces. Use of such a mould assembly ensures that the amount of material that is compacted is substantially consistent. This results in pellets of substantially uniform characteristics, such as uniform mass, size, and/or shape. This contributes to ease of handling and transporting pellets.

In one embodiment the mould assembly also acts as a container in which torrefaction takes place, prior to compaction, or simultaneously with compaction. For example, the biomass may undergo a first phase of compaction, in which air is substantially forced out of the biomass and the biomass torrefied, followed by one or more further phases of compaction at higher pressure than the first phase, to fully compress the biomass into a substantially spherical shape. The one or more further phases of compaction are carried out while the biomass is still hot from torrefaction. Alternatively, compaction is increased gradually during and after torrefaction, rather than in two or more distinct phases.

Any suitable process may be used to heat the mould assembly, such as, for example, externally applied heating elements or heating elements embedded with the assembly. Such elements may be electrical, such as resistive heating elements. Alternatively, the assembly may be heated in a furnace or other large-scale heater. Heating may be carried out as part of an on-line process, such as part of an assembly line. The biomass may be heated prior to being loaded into the mould assembly. Such prior heating expedites torrefaction of the biomass in the mould assembly. Alternatively, the biomass is torrefied prior to being loaded into the mould assembly. In one embodiment the biomass is loaded into the assembly and compressed into a pellet while still hot. In another embodiment the biomass is loaded into the assembly after it has cooled. For example, the biomass may be allowed to cool to ambient temperature.

Torrefaction in the mould assembly requires raising the temperature of the biomass to a temperature of about 200° C. to about 300° C. As noted above, the biomass material may be compacted prior to and/or during heating to substantially reduce or remove pore spaces and air between biomass particles, to allow for better heat transfer in the biomass and to reduce any chance that the biomass oxidizes or combusts. Torrefaction improves the properties of biomass as a fuel. The treatment yields a more uniform product with lower moisture content and higher specific energy content compared to those of the initial biomass. The process removes undesirable components such as smoke producing compounds, water vapour, and carbon dioxide, and forms a solid product, retaining, for example, approximately 70% of the initial weight and up to 90% of the original energy content. Torrefaction increases the specific energy of the biomass, as some non-combustible mass (e.g., water) is lost. For example, torrefied biomass can achieve energy characteristics similar to those of coal. Thus, pellets as described herein may be used in a power plant to replace entirely or to supplement the use of coal.

Although torrefaction may be carried out in an inert atmosphere, the methods described herein conveniently allow for torrefaction to be done without the need for an inert atmosphere. This is because the material is separated from air simply by squeezing the air out using the mould assembly, and because the mould substantially encompasses the material, entry of air is prevented. In addition, volatiles (i.e., volatile organic compounds (VOCs)) and water vapour flowing out of the biomass during torrefaction effectively prevent inflow of any other gases. Torrefaction in the mould activates binders in the material that hold the pellet together, such that added binders may not be required. However, water may be used as a binder, as wetting of the material with water improves binding of the material. Other binders may optionally be used.

After sufficient time is taken to torrefy the biomass material, it is compressed in the mould assembly until the mould faces are compressed to their final position and the substantially spherical shape is attained. The pellet is then removed from the assembly and allowed to cool. During cooling of the pellet the biomass may exhibit "spring-back", resulting in a pellet that is not perfectly spherical, ellipsoidal, or oblate (i.e., referred to herein as "substantially spherical").

A mould assembly that creates multiple planes of symmetry within the compressed biomaterial will result in better adhesion/cohesion of the biomass particles. For example, a mould assembly having two mould faces creates only one (equatorial) plane of symmetry in the biomass material. However, increasing the number of mould faces and thus directions from which the material is compressed creates multiple planes of symmetry within the material. Interaction of the planes of symmetry during compaction produces shear force and friction, causes re-orientation and deformation of the material, and provides more opportunities for interlocking mechanisms to develop and bind the pellet material together. More interactions between planes will produce better binding of the material, and a more robust pellet. Techniques such as isostatic pressing, hot isostatic pressing, and simultaneous compression along multiple axes directed toward the sphere center, may be used in such embodiments.

Figure 1:
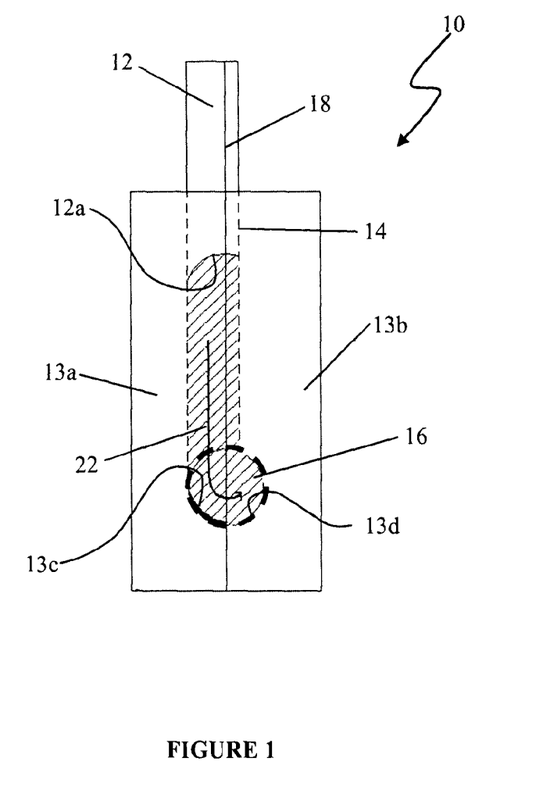
FIG. 1 is a diagram of a mould and die assembly for making substantially spherical biomass pellets, according to one embodiment.

One embodiment, shown in FIG. 1, comprises an assembly 10 including a mould 13a, 13b and die 12. Mould sections 13a, 13b have mould faces 13c, 13d, corresponding to portions of a cavity 16 where the pellet is formed. The die 12 has a concave mould face 12a corresponding to a portion of the cavity 16. Thus, mould faces 13c, 13d, and the die face 12a together complete the substantially spherical cavity when the die is fully engaged. The die 12 is used to force material down a shaft 14 into the cavity 16. However, the die axis is not aligned with a central axis of the cavity (shown by line 18); rather, it is offset. The die forces biomass material into the cavity off-axis such that the material must follow a path shown by arrow 22 to fill the void, and is thus re-oriented. The die and shaft may be implemented in a way that prevents rotation of the die in the shaft, such as with a keyway or non-circular cross-sections. The assembly ensures that the biomass material undergoes rotation and re-orientation, providing an opportunity for particles to interlock and bind. This embodiment also increases shear forces between particles, thereby increasing frictional heating, which causes more lignin and/or other binders to be extracted, and results in better binding of the biomass material.

Figure 3:
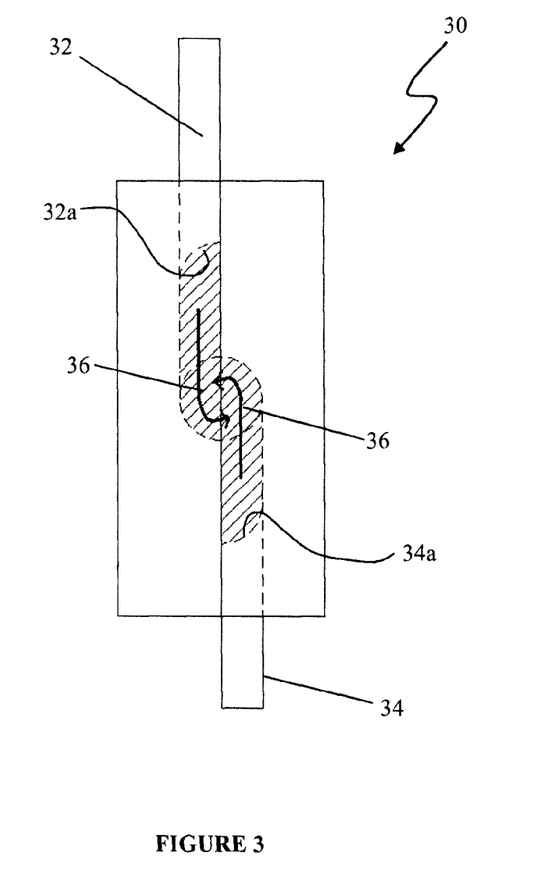
FIG. 3 is a diagram of a mould and die assembly for making substantially spherical biomass pellets, according to another embodiment.

Another embodiment of a mould assembly 30 is shown in FIG. 3. This embodiment allows for more even compression and more complete re-orientation of the biomass in the mould. This embodiment is similar to that shown in FIG. 1, except that it employs a first die 32 and a second die 34 that are substantially opposed and are not coaxial. The dies have mould faces 32a and 34a each corresponding to a portion of the mould cavity. Neither die is coaxial with a central axis of the mould cavity. The two dies compress and re-orient the biomass material in the cavity more effectively than the embodiment of FIG. 1, as shown by the arrows 36.

The methods described herein, or variations thereof, are adaptable for large-scale production of substantially spherical biomass pellets.

Embodiments of the invention are further described by way of the following non-limiting examples.

Example 1. Production of Substantially Spherical Biomass Pellets

Figure 2:
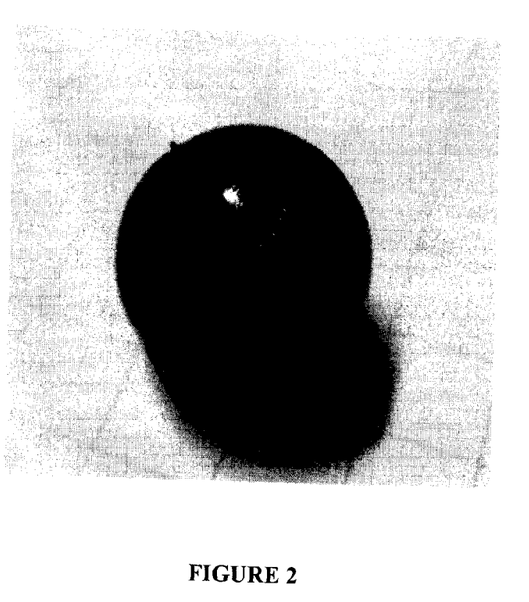
FIG. 2 is a photograph of a substantially spherical biomass pellet made with the assembly of FIG. 1.

A mould assembly accordingly to the embodiment shown in FIG. 1 was implemented with torrefaction. As this must be done in the absence of $O_2$, the mould and die assembly were used to physically separate the biomaterial material from $O_2$ rather than shield it in an inert atmosphere. After loading with poplar biomass (to about 30% greater than the mass of the final pellet), the die was used to squeeze air out of the biomass/assembly and create an environment that substantially prevented entry of air. A 210 W heating tape was placed around the assembly heat the mould and die, and controlled by a Variac. Over about 20 minutes the temperature of the assembly was raised to 280° C. as measured using a K-type thermocouple on the outside of the assembly, and the assembly was held at this temperature for about 10 minutes. It was assumed that this was the approximate temperature of the biomass in the mould. It had previously been determined that 280° C. provided about a 30% mass reduction of the biomass material, which was an indication that the desired level of torrefaction of material had been achieved. About 4540 kg was applied to the assembly to ensure that the biomass was fully compressed into the mould. The pellet was removed and is shown in the photograph of FIG. 2.

Pellets were also prepared from poplar dust that had been torrefied and cooled prior to loading into the assembly, to compare with in-situ torrefied pellets. In the latter case, binding of the torrefied biomass was incomplete, such that solid pellets were not produced. Without wishing to be bound by theory, it is believed that after heating or torrefaction, the biomass material cools to a threshold temperature at or below which thermosetting occurs and binding of the material is no longer possible. This is believed to result from loss of the required (plastic) properties of the material. As reheating the material generally does not restore the properties, the loss is often permanent. The specific threshold temperature varies according to the characteristics of the biomass material used. For the purpose of this disclosure, the threshold temperature will be referred to as "$T_{threshold}$". However, further trials using previously torrefied biomass resulted in the successful production of pellets (see Example 6).

The substantially spherical biomass pellets were subjected to tensile, hydrophobicity, and abrasion tests. The pellets withstood compressive forces between 6.75-17.06 MPa and absorbed between 11.0-29.4% moisture yet returned to an air-dry moisture content of <5% on a mass basis within 24 hours. The pellets did not abrade significantly, and abrasion resistance was superior to that of conventional pellets. In addition, the pellets did not disintegrate when immersed in water, but instead remained intact and possessed much of their original physical characteristics once dried. In addition, specific energies up to 22.09 MJ/kg were obtained for the pellets on an "as received" basis.

Example 2. Alternative Process Method

A ligno-cellulosic material in any form, (e.g., particles, chips, granules, fibres, powder, dust, and combinations thereof) is formed into a substantially spherical pellet. The material itself is used as the binder material and no additives are used in the process. Pre-processing of the material is carried out in a substantially oxygen-free environment. This may be accomplished by mechanically separating the material from the atmosphere by placing it in a closed mould and die assembly while heating.

Pre-processing may include one or more of drying the material to a selected dryness, reducing it in size in order to fit it into the mould and die assembly, and heating the material. Heating may be limited to pre-heating, without torrefaction, so that torrefaction is carried out in the mould and die assembly. Excess material that does not fit into the assembly may be recycled or used as a by-product. For example, the by-product may be burned for energy.

Heating of the material allows for easier mechanical compression of the material and torrefaction modifies the material to give it beneficial properties such as increased specific energy and hydrophobicity. Volatile components of the material may be liberated by torrefaction. Some of these components may be combusted for energy, collected and separated as products, or recycled to provide a non-oxidizing environment for subsequent process steps.

The mould and die assembly may comprise two halves held together using a sleeve. A keyway in the die halves allows for one or two punches to compact the material from either side. The one or two punches are not centered on a central axis of the assembly. This produces an offset force on the material in the mould assembly, resulting in increased mechanical work and friction in the mould, increasing particle cohesion through interlocking mechanisms. Heat generated through this process together with applied heat allows surface-surface bonds to form in the material. These bonds may include those formed from natural binding agents in the ligno-cellulose, as well as other chemical bonds (covalent, van der Waals, thermosetting plastic, etc.). Heating of the mould and die assembly is maintained during compression of the material which facilitates such bonding of the material as to increase process efficiency.

Pellets are removed from the assembly while still hot from the die. An ejection device (e.g., a plunger or a lever) may be used to remove the pellet from the mould. Newly formed pellets are sent to a cooling stream which may be non-oxidizing atmosphere or simply air, in which heat may be extracted and recycled back into the process. Cooled pellets may then be packaged and/or shipped.

Example 3. Alternative Process Method

Ligno-cellulosic base material is mixed with alternative materials such as recycling waste, dewatered municipal solid waste, etc., or a combination thereof. Hydrocarbons such as coal dust or recycled plastic may also be included to increase the specific energy of the materials and eventual pellet. Additives such as lignin, distillers grain, starch, etc. may be used to additionally bind together fibres and particles in the process.

The base material may be pre-processed as fibres, fines, and/or particles with an acceptable moisture content for compaction and pelletization. The base material may be bound together by interlocking mechanisms that are a result of mechanical deformation. In one embodiment, torrefaction may be carried out prior to pellet formation, provided that the material is not allowed to cool below the threshold temperature $T_{threshold}$, or during pellet formation. In another embodiment, torrefaction may be carried out prior to pellet formation, and, wherein the material is allowed to cool below the threshold temperature $T_{threshold}$, the material is subjected to further torrefaction during pellet formation. The mixed material is fed into a pelletization machine, which may auger the material to reduce its size prior to pelletization. In one embodiment the auger may comprise two rotating tapered grooved rollers. The material passes through a trough between the rollers, both of which rotate inwards, subjecting the material to multi-axial compression as it is compacted. In another embodiment, the auger system may comprise a single tapered wheel with grooves, housed in a shell having matching internal surface. The material is forced through the auger in a screw-like motion and experiences multi-axial compression. In a further embodiment, the auger comprises two rotating plates with outwards or inwards spiraling tapered grooves. Material is pressed between the two plates and is reduced in size as it follows the tapered grooves, eventually being ejected from the grooves. In each embodiment, a continuous supply of material is fed into the auger and the motion of compaction causes separation of the stream into individual pellets. The material may be fed in increments of a predetermined mass appropriate for making pellets. Heating of the material may be derived from friction from the mechanical work involved in compression, and may also be applied to the auger system. Heat may also be added to the system by pre-heating the base material and/or the alternative material.

Pellets are removed from the assembly while still hot from the die. Newly formed pellets may optionally be coated with a substantially waterproof coating, while still hot or after cooling. Cooling may be done in a non-oxidizing atmosphere or simply in air, and heat may be extracted and recycled back into the process.

Example 4. Alternative Process Method

A base material of ligno-cellulose, such as compost, is comminuted using a hammer mill or similar device, or may also be left as is. A hot steam or water bath is used as a pre-processing (i.e., torrefaction) heat source, which chemically alters the material.

After torrefaction, the material is reduced in size, such as through steam explosion. Binders may be added at this time and may include a material such as starch, fat, oil, water, lignin, plastic, distillers grain, and other such materials known in the art. The bath may be recycled. If a water bath is used, a centrifuge may be used to separate the material from the liquid phase. If a steam bath is used, a centrifuge may be used if the material is in a dust/powder form. An isolated separation stream may be used to extract the material while keeping the steam chamber operating continuously.

Depending on the scale of the process, the material may be loaded into a mould and die assembly or into a continuous extrusion process. The material is loaded while still hot, i.e., at or above the threshold temperature $T_{threshold}$. Pre-compaction may optionally be used. The mould and die assembly may be, for example, a simple two part clamshell, or an assembly as described elsewhere herein. Depending on binder content, the material may not need any complex die configuration. The material may also be compacted in a multi-part die, allowing for an additive-free pellet.

Pellets are removed from the assembly while still hot. Newly formed pellets may optionally be coated with a substantially waterproof coating, while still hot or after cooling. By-products from the bath stage may be applied to the pellets either wholly or in part.

By-products may be extracted from the bath or steam through separation and condensation. These may be used as a secondary output or as a source of energy to create heat. The by-products may also be integrated with the materials as a binder. Left over flashing or residue from the pellet making process may be put back into the process, or burned for energy to heat the bath.

Example 5. Production of Substantially Spherical Biomass Pellets from Agricultural Biomass Widespread use of biomass pellets will be possible if a wide variety of biomaterials can be used. Accordingly, processes for producing pellets must be broadly applicable to such a variety of biomaterials. In this example methods generally as described in Example 1 were used to produce spherical biomass pellets from agricultural biomass; specifically, reed canary grass and hemp. These materials were selected to test the generality of the methods described herein, as production of substantially spherical pellets from these materials was expected to be more difficult relative to production from other materials, such as wood.

Reed canary grass was torrefied at temperatures between about 229° C. and 254°. A 30 minute timer was started, and the biomass was heated to the desired temperature. The biomass was maintained at that temperature until the 30 minutes was complete. Hemp was torrefied at temperatures between about 241° C. and 260° C. For both materials, mass loss after torrefaction ranged from about 19% to 27%, with higher mass loss occurring at higher torrefaction temperature.

Pellets produced from reed canary grass and hemp were subjected to tests to evaluate tensile strength, abrasion resistance, and moisture sensitivity. For tensile strength testing, pellets were placed in a press and crushed using hydraulic pressure. The tensile strength was read from a digital load cell used to measure the force applied at failure. Reed canary grass pellets exhibited a tensile strength of about 147 kg, whereas hemp pellets exhibited tensile strength from about 144 kg to 247 kg, with higher tensile strength corresponding to lower torrefaction temperature.

For abrasion resistance testing, pellets were weighed and then placed in a rock tumbler with 20 glass marbles that were about four times as dense as the pellets and approximately the same size as the pellets. The tumbler was turned on for 10 minutes and spun at 60 rpm. The pellet was then removed and weighed again to determine mass loss. Both reed canary grass pellets and hemp pellets exhibited less than 1% mass loss under this test.

For moisture sensitivity testing, pellets were weighed and then placed individually in containers with tap water and left exposed to ambient conditions in the lab. After about 15.5, 19, and 88 hours, the pellets were removed from the water, patted dry with a paper towel and weighed. The change in mass was used as an indication of the change in moisture content. After the 15.5 and 19 hour measurements the pellets were placed back into the water in their containers. The mass of reed canary grass pellets increased by about 13-22% at 15.5 hours, 14-23% at 19 hours, and 19-27% at 88 hours. The mass of hemp pellets increased by about 14-24% at 15.5 hours, 14-26% at 19 hours, and 17-28% at 88 hours. For both reed canary grass pellets and hemp pellets, at each time point (15.5, 19, and 88 hours), there was a trend wherein the amount of water absorbed (i.e., the increase in mass) decreased with increasing torrefaction temperature. Throughout these tests it was noted that, where any leachate was produced by soaking the pellets in water, higher torrefaction temperature reduced leaching. It is believed that, in general, the production of leachate lowers the strength characteristics of the pellets.

After the 88 hour measurement the pellets were allowed to dry in individual containers exposed to ambient conditions in the lab. At about 140 hours they were weighed to determine their final dry mass. All pellets exhibited a slight decrease in mass (about 0.6-1.3%), caused by minor flaking away of particles from the surfaces of pellets.

These tests, together with the above examples, indicate that substantially spherical pellets can be produced as exemplified herein, using biomaterials as diverse as wood, reed canary grass, and hemp. Such pellets have high tensile strength and do not abrade significantly, to resist damage in shipping and handling. Indeed, abrasion resistance of the substantially spherical pellets is superior to that of conventional pellets. In addition, these pellets did not disintegrate when immersed in water, but instead remained intact and appeared to retain their original physical characteristics once dried.

Example 6. Production of Substantially Spherical Biomass Pellets from Previously Torrefied Biomass Substantially spherical pellets were made from torrefied and untorrefied pine biomass obtained from a commercial wood pellet manufacturer. In this example methods generally as described in Examples 1 and 5, including torrefaction for 30 minutes, were used for the untorrefied biomass. The torrefied biomass was heated until the temperature reached 275° C., and then heating was stopped, such that the torrefaction time was about 22-23 minutes. Pellets made from the untorrefied biomass had a tensile strength of about 143 kg, and 100% abrasion resistance. Pellets made from the torrefied biomass had a tensile strength of about 76 kg and 99.9% abrasion resistance. These results indicate that methods for producing substantially spherical biomass pellets as described herein may include using untorrefied biomass, or using previously torrefied biomass. Furthermore, a combination of untorrefied biomass and previously torrefied biomass may also be used.

It will be appreciated that the above examples may be carried out in whole or in part, and the examples or parts thereof may be combined.

The contents of all cited patents, patent applications, and publications are incorporated herein by reference in their entirety.

While the invention has been described with respect to illustrative embodiments thereof, it will be understood that various changes may be made to the embodiments without departing from the scope of the invention. The described embodiments are to be considered merely exemplary and the invention is not to be limited thereby.

The invention claimed is:

1. A mould assembly for producing a biomass pellet, comprising:
   two or more mould faces, each face comprising a concave portion of a mould cavity;
   at least one mould face being moveable toward the mould cavity along an axis that is not coaxial with a central axis of the mould cavity;
   wherein the mould cavity has rounded surfaces without corners in three dimensions;
   wherein movement of the at least one mould face toward the mould cavity compresses, re-orients, and rotates biomass in the mould cavity to produce the biomass pellet.

2. The mould assembly of claim 1, wherein all of the two or more mould faces are moveable, the mould faces together forming the mould cavity;
   wherein movement of the mould faces compresses, re-orients, and rotates biomass in the mould cavity to produce the biomass pellet.

3. The mould assembly of claim 1, wherein the mould cavity is spherical, spheroidal, ellipsoidal, or oblate.

4. The mould assembly of claim 1, further comprising a heating element disposed with the assembly.

5. The mould assembly of claim 1, wherein the mould assembly creates multiple planes of symmetry within the compressed biomass.

6. The mould assembly of claim 1, wherein movement of the at least one mould face includes at least one of isostatic pressing, hot isostatic pressing, and simultaneous compression along multiple axes directed toward a center of the mould cavity.

7. The mould assembly of claim 1, including at least one die having a concave mould face.

8. The mould assembly of claim 1, comprising:
   at least one die having a concave mould face movable toward the mould cavity, wherein a central axis of a direction of travel of the die toward the mould cavity is not coaxial with a central axis of the mould cavity.

9. The mould assembly of claim 1, wherein the mould assembly is adapted to receive pre-processed biomass;
   wherein the pre-processed biomass has been heated, pro-compacted, or heated and pre-compacted.

10. A method for producing a biomass pellet, comprising:
    compressing biomass between two or more mould faces of a mould assembly, each face comprising a concave portion, the mould faces together forming a mould cavity having rounded surfaces without corners in three dimensions;
    wherein compressing comprises moving at least one mould face toward the mould cavity along an axis that is not coaxial with a central axis of the mould cavity;
    wherein compressing comprises re-orienting and rotating the biomass in the mould cavity.

11. The method of claim 10, further comprising compressing the biomass in the mould at a first pressure, and then further compressing the biomass at a second pressure, wherein the second pressure is greater than the first pressure.

12. The method of claim 11, comprising applying the second pressure while heating the biomass to or above a threshold temperature $T_{threshold}$.

13. The method of claim 10, wherein compressing is carried out with increasing pressure until a maximum pressure is reached.

14. The method of claim 10, comprising placing heated biomass in the mould assembly.

15. The method of claim 10, comprising heating the biomass in the mould assembly.

16. The method of claim 15, wherein heating the biomass comprises torrefying the biomass.

17. The method of claim 15, comprising heating the biomass to or above a threshold temperature $T_{threshold}$.

18. The method of claim 10, including producing a biomass pellet with rounded surfaces in three dimensions.

19. The method of claim 10, including producing a biomass pellet that is spherical, spheroidal, ellipsoidal, or oblate.

20. The method of claim 10, wherein moving the at least one mould face toward the mould cavity includes forming a mould cavity that is spherical, spheroidal, ellipsoidal, or oblate.

21. The method of claim 10, wherein moving the at least one mould face toward the mould cavity includes at least one of isostatic pressing, hot isostatic pressing, and simultaneous compression along multiple axes directed toward a center of the mould cavity.

* * * * *